R. W. DICK.
VEHICLE WHEEL RIM.
APPLICATION FILED MAR. 16, 1914.
1,157,156.
Patented Oct. 19, 1915.
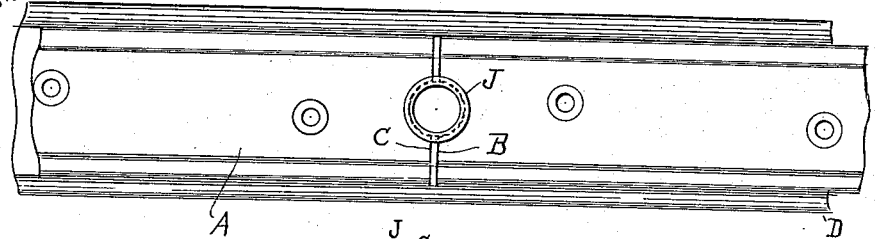
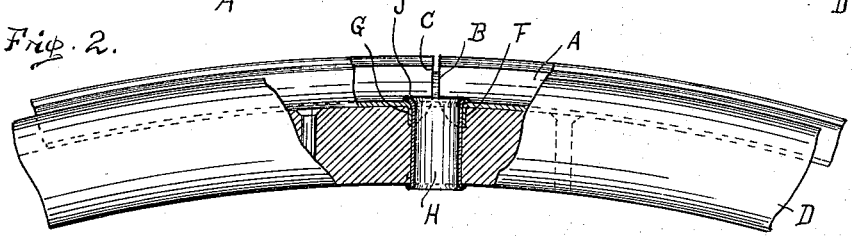
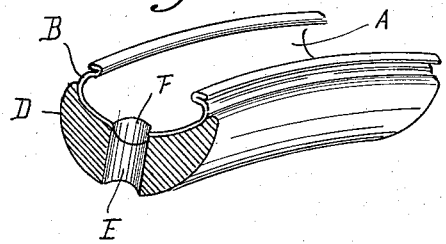
WITNESSES:
INVENTOR.
Ralph W. Dick
BY
ATTORNEYS.

UNITED STATES PATENT OFFICE.

RALPH W. DICK, OF FORT WAYNE, INDIANA, ASSIGNOR TO LOUIS RASTETTER & SON, A COPARTNERSHIP EXISTING BETWEEN ELIZABETH RASTETTER AND WILLIAM C. RASTETTER, BOTH OF FORT WAYNE, INDIANA.

VEHICLE WHEEL-RIM.

1,157,156.      Specification of Letters Patent.      Patented Oct. 19, 1915.

Application filed March 16, 1914. Serial No. 824,880.

*To all whom it may concern:*

Be it known that I, RALPH W. DICK, a citizen of the United States of America, and resident of Fort Wayne, in the county of Allen and State of Indiana, have invented certain new and useful Improvements in Vehicle Wheel-Rims, of which the following is a specification.

This invention relates to improvements in vehicle wheel rims of that class consisting of a wooden rim having around its periphery a rim of metal, and which are used in conjunction with pneumatic tires.

The object of the improvement is to effectively secure the ends of the metal rim at their meeting place to the wooden rim, and to provide means for protecting the valve stem of the pneumatic tire from becoming injured by contact with edges of the metal rim where it passes therethrough.

The object of the improvement is accomplished by the construction illustrated by the accompanying drawings, in which:

Figure 1 is a plan view of a part of the rim at the meeting place of the ends of the metal rim; Fig. 2 is a side view of Fig. 1, shown partly in section; and, Fig. 3 is a detail view in perspective showing a section through the wooden rim at the aperture made therein for the valve stem and showing one end of the metal rim as it appears pressed into place.

Similar characters of reference indicate corresponding parts throughout the several views, and referring now to the same: A is a rim of metal formed to receive a pneumatic tire, and (B) and (C) are respectively its meeting ends. The rim shown in the drawings is of a transverse form adapted to receive a tire of that kind known as the "clencher type". However, this invention applies equally well to such rims as are made for other types of tires.

(D) is a wooden rim made in the usual manner shaped to receive in its outer perimeter the metal rim above referred to.

The invention consists of the manner of securing the ends of the metal rim about the wooden rim and the provision of a metallic shield for the stem of the tire.

The wooden rim (D) has an opening (E) made therein through which the stem of the tire (not shown) is adapted to be extended when the tire is in place, and the metal rim (A) is placed around the outer periphery of the rim with its ends (C) and (B) extending over the opening (E). Those portions F—G, respectively, of the ends of the metallic rim are then pressed into the opening (E) so as to conform correspondingly with the adjacent sides thereof, and an eyelet of metal is forced into the opening, its flanged upper end (J) binding the ends of the metal rim down against the wooden rim and the barrel portion of the eyelet holding the inwardly bent portions F—G of the rim against the sides of the opening. The lower end of the eyelet is crimped over the adjacent surface of the wooden rim at the lower end of the opening. Thus the ends of the metallic rim is permanently held fast to the wooden rim, and the eyelet affords a lining for the valve stem opening that shields the stem from becoming damaged by coming into contact with edges of the metallic rim.

What I claim is:—

1. In a rim for wheels of the class described, a wooden rim having an opening for the valve stem of the tire; a metallic rim surrounding the wooden rim, its ends meeting at the valve stem opening therein and each having a portion thereof pressed downwardly into the opening against the adjacent wall thereof; and an eyelet extending through the opening, and holding the downwardly pressed portion of each end of the metallic rim in place.

2. A rim for wheels consisting of a wooden rim and an outer metallic rim extending around the former, and an eyelet extending through the wooden rim at the juncture of the ends of the metallic rim and securing the respective meeting ends.

In testimony whereof I affix my signature, in presence of two witnesses.

RALPH W. DICK.

Witnesses:
MATHILDA METTLER,
W. G. BURNS.

Copies of this patent may be obtained for five cents each, by addressing the "Commissioner of Patents, Washington, D. C."